(12) United States Patent
Schreiber et al.

(10) Patent No.: US 11,428,299 B2
(45) Date of Patent: Aug. 30, 2022

(54) DRIVE CABLE AND METHOD OF PRODUCTION

(71) Applicants: Webasto SE, Stockdorf (DE); KÜSTER Unternehmensgruppe, Ehringshausen (DE)

(72) Inventors: Ulrich Schreiber, Stockdorf (DE); Günter Reinhardt, Aßlar (DE); Markus Eckhardt, Mittenaar (DE)

(73) Assignees: WEBASTO SE, Stockdorf (DE); KÜSTER UNTERNEHMENSGRUPPE, Ehringshausen (DE)

( * ) Notice: Subject to any disclaimer, the term of this patent is extended or adjusted under 35 U.S.C. 154(b) by 553 days.

(21) Appl. No.: 16/653,194

(22) Filed: Oct. 15, 2019

(65) Prior Publication Data
US 2020/0116241 A1 Apr. 16, 2020

(30) Foreign Application Priority Data

Oct. 16, 2018 (DE) .................... 10 2018 125 647.7

(51) Int. Cl.
| | |
|---|---|
| *B29C 48/154* | (2019.01) |
| *F16H 19/06* | (2006.01) |
| *E05F 11/34* | (2006.01) |
| *B29C 48/21* | (2019.01) |
| *B29C 48/79* | (2019.01) |
| *B29C 48/88* | (2019.01) |
| *B29K 105/00* | (2006.01) |
| *B60J 7/04* | (2006.01) |
| *E05F 15/60* | (2015.01) |
| *B29K 77/00* | (2006.01) |

(52) U.S. Cl.
CPC ....... *F16H 19/0645* (2013.01); *B29C 48/154* (2019.02); *B29C 48/21* (2019.02); *B29C 48/79* (2019.02); *B29C 48/911* (2019.02); *E05F 11/34* (2013.01); *B29K 2077/00* (2013.01); *B29K 2105/0097* (2013.01); *B60J 7/04* (2013.01); *E05F 15/60* (2015.01); *E05Y 2900/542* (2013.01)

(58) Field of Classification Search
CPC .... B29C 48/154; B29C 48/21; F16H 19/0645
See application file for complete search history.

(56) References Cited

U.S. PATENT DOCUMENTS

| | | | |
|---|---|---|---|
| 2,956,305 A | 10/1960 | Raydt et al. | |
| 4,625,504 A * | 12/1986 | Burghardt | D07B 1/162 |
| | | | 57/7 |
| 4,849,038 A | 7/1989 | Burghardt et al. | |

(Continued)

FOREIGN PATENT DOCUMENTS

| | | |
|---|---|---|
| CA | 2 567 960 A1 | 12/2005 |
| CN | 101296758 A | 10/2008 |

(Continued)

*Primary Examiner* — James Sanders
(74) *Attorney, Agent, or Firm* — Fitch, Even, Tabin & Flannery, LLP (57) ABSTRACT

A drive cable for actuating a vehicle element movable relative to a vehicle body is provided, the drive cable having a cable body having a cable core around which a coil following a helical line is coiled, the coil serving to engage with a gear wheel, the cable body being provided with a cable sheath. The cable sheath is glued to the coil.

15 Claims, 7 Drawing Sheets

(56) References Cited

U.S. PATENT DOCUMENTS

| | | | |
|---|---|---|---|
| 5,075,952 A | 12/1991 | Pfaff | |
| 5,239,890 A * | 8/1993 | Sosnoski | F16C 1/205 |
| | | | 74/502.5 |
| 5,577,416 A | 11/1996 | Fukura et al. | |
| 10,302,180 B2 | 5/2019 | Schreiber et al. | |
| 2013/0291665 A1 | 11/2013 | Rodenhauser | |

FOREIGN PATENT DOCUMENTS

| | | |
|---|---|---|
| CN | 104047193 A | 9/2014 |
| CN | 204878276 U | 12/2015 |
| DE | 7136899 U | 1/1972 |
| DE | 3513093 A1 | 10/1986 |
| DE | 3614241 A1 | 10/1987 |
| DE | 3924121 A1 | 1/1991 |
| DE | 10 2010 055 809 B4 | 9/2012 |
| DE | 102015104068 A1 | 9/2016 |
| EP | 0032065 A1 | 7/1981 |
| WO | 2005/054569 A2 | 6/2005 |
| WO | 2007/050069 A1 | 5/2007 |
| WO | 2018/130259 A1 | 7/2018 |

\* cited by examiner

DRIVE CABLE AND METHOD OF PRODUCTION

CROSS-REFERENCE TO RELATED APPLICATION

This application claims priority from German Patent Application Number DE 10 2018 125 647.7, filed Oct. 16, 2018, which is hereby incorporated herein by reference in its entirety for all purposes.

The invention relates to a drive cable for actuating a vehicle element movable relative to a vehicle body, the drive cable having the features of the preamble of claim 1, and to a method for producing said drive cable.

A drive cable of this kind is known from practice and serves, for example, to actuate a lid element of a sunroof mechanism by means of which a roof opening of the vehicle in question can be selectively closed or at least partially opened, or to actuate a shading mechanism of a vehicle roof. For this purpose, the drive cable is driven by a drive motor and transmits a drive torque to the vehicle element in question, i.e. to the lid element or to a shading element of the shading mechanism.

The known drive cable comprises a cable body which consists of a flexible cable core around which a coil following a helical line is coiled, which corresponds to what is referred to as a helix cable. Furthermore, the cable body is provided with a cable sheath made of plastic. The gaps covered by the cable sheath are filled with a filler. However, the drive cable with the filler may make modifications to the entire system necessary, which is reflected in its production costs. As compared to a conventional helix cable, the engagement of the teeth of a driving gear wheel, i.e. the geometry of the driving gear wheel or the like, will have to be modified, for example. Moreover, the drive cable may require greasing in its installation position in order to achieve an appropriate service life. This is because the filler is deformed by the engagement of the teeth of the driving gear wheel. Moreover, there is the risk of the cable sheath of this drive cable coming loose from the cable body, which may result in the cable resisting movement within the cable guide, in noise, and even in failure of the drive cable.

Document DE 10 2010 055 809 B4 discloses a drive cable which is realized as a helix cable and which can be used to drive a movable vehicle element. Said drive cable comprises a cable body which has a flexible cable core and a coil coiled around the cable core and following a helical line. The coil forms teeth of the drive cable and can be engaged with a driving gear wheel of a drive motor. Moreover, the cable body is coated with a flock which is supposed to reduce drive noise as the drive cable is being guided in a guide channel. However, the flock is subject to wear during use of the drive cable, which means that the noise level increases with age.

The object of the invention is to provide a drive cable of the above kind that is characterized by low production costs while still meeting high requirements in terms of noise behavior in the long run.

According to the invention, this object is attained by the drive cable having the features of claim 1.

According to the invention, a drive cable for actuating a vehicle element movable relative to a vehicle body is proposed, said drive cable comprising a cable body having a flexible cable core and a coil following a helical line. The cable body is provided with a cable sheath which is glued to the coil. By gluing the cable sheath to the coil, a connection and adhesion stable in the long run is achieved between the cable sheath and the cable body. The risk of damage during actuation of the drive cable can be minimized in this way. In particular, twisting or axial shifting of the cable sheath on the cable body and cracking noises, which may be produced by the cable sheath moving on the cable body, can be prevented. The cable sheath, which may in particular be made of a plastically or elastically deformable plastic, ensures low-noise sliding of the drive cable in a cable guide. The cable sheath can form a continuous guiding surface of the drive cable in the cable guide and is substantially free of any potentially rattling edges. The cable's circumferential surface or outer surface, which is formed by the cable sheath, ensures centering of the drive cable in the cable guide. Since the guiding surface formed by the cable sheath is closed, friction of the drive cable in the cable guide or cable duct can be kept low.

When the drive cable according to the invention is actuated by means of a drive pinion for the first time, the engagement of the teeth of the drive pinion produces an impression of teeth of sufficient depth in the cable sheath, causing the cable sheath to mold to the flanks of the coil, which is in particular made of metal. That is, the cable sheath is deformed as required upon engagement of the drive pinion so as to make nonslip actuation of the drive cable possible. The cable sheath is only deformed in an area along an axially extending circumferential line into which the teeth of the drive pinion engage.

After engagement of the teeth of the drive pinion, the cable sheath of the drive cable can stay deformed, meaning that the cable's circumferential surface formed by the cable sheath is then provided with corresponding indentations. Prior to the engagement of the teeth, however, the cable's circumferential surface formed by the cable sheath is closed, i.e. continuous. In this state, the cable sheath bridges the gaps between the turns of the coil.

Rattling of the drive cable during operation is avoided since the inherent stiffness of the drive cable causes the drive cable to be in contact with the walls of the respective cable guide duct. So the course and design of the cable guide duct have an important function during operation.

In a preferred embodiment of the drive cable according to the invention, the cable sheath, the coil and the cable core define a cavity which follows a helical line, i.e. the coil, and the cable sheath has a wrinkle-free surface on its side facing away from the cable core when viewed in the longitudinal direction of the cable, i.e. an outer surface that extends at least largely parallel to the longitudinal direction of the cable. Consequently, the cable sheath has a circumferential contour that remains constant across the length of the drive cable and forms a tube whose inner side rests on the coil of the cable body. The cavity defined by the cable sheath and the coil remains empty, i.e. it is free of any fillers or the like. Hence, there is no need to modify a drive for driving the drive cable, unlike in the case of a conventional helix cable.

In a specific embodiment of the drive cable according to the invention, the cable sheath comprises a cover layer, which forms the circumferential surface of the drive cable, and an adhesive layer which is glued to the coil and thus ensures the secure connection between the cable body and the cable sheath. The cover layer, which may have a thickness of few tenths of a millimeter and is therefore easily impressed, is a surface that is capable of sliding and simultaneously extensible and which may consist of a polyamide, such as PA6. The adhesive layer is made of a long-chain polyethylene, for example, and can serve as a shear-deformable intermediate layer or buffer layer which can reduce local stress due to the engagement of the teeth of a drive pinion, which, in turn, can prevent that the cable sheath comes loose from the cable body. The cover layer and the adhesive layer can be applied to the cable body by co-extrusion.

To further improve the adhesion of the cable sheath to the cable body, the cable body of a particularly preferred embodiment of the drive cable according to the invention is provided with a plastic coat which forms a surface of contact with the cable sheath. The plastic coat, which is applied to the cable body in a force-locking and form-fitting manner and which constitutes a good adhesive partner for the cable sheath, consists in particular of a polyamide, preferably of PA11.

In a specific embodiment of the drive cable according to the invention, the plastic coat has an in particular circumferential flattened portion at the circumference of the coil to enlarge the surface of contact between the cable body and the cable sheath. Thus, the screw-shaped surface of contact between the cable sheath and the plastic coat adhering to the cable body in a form-fitting and force-locking manner is enlarged.

In another specific embodiment of the drive cable according to the invention, the cable sheath has ribs extending in the longitudinal direction of the cable at its circumferential surface. Depending on their design, these ribs can reduce friction during guiding of the drive cable in a cable guide, can have an anti-rattling effect and may also be designed as what is referred to as sacrificial ribs, which are broken in during use of the drive cable. Thus, the noise behavior of the drive cable during its actuation in a cable guide can even improve with age. The ribs can have a straight or helical shape.

To improve the sliding behavior of the drive cable in a cable guide, the plastic of the cable sheath can additionally be blended with slide-promoting substances, such as PTFE or the like.

The invention also relates to a method for producing a drive cable for actuating a vehicle element movable relative to a vehicle body. This method comprises the following steps:
  providing a cable body which comprises a flexible cable core provided with a coil following a helical line;
  introducing the cable body into an extrusion die; and
  extruding a plastic tube by means of the extrusion die and gluing the plastic tube to the coil of the cable body to form a cable sheath surrounding the cable body.

In the method according to the invention, the cable sheath is thus produced in a continuous process by means of an extrusion die and is glued to the coil of the cable body, resulting in a drive cable that has high wear resistance and can be guided in a cable guide with permanently low noise.

In a specific embodiment of the method according to the invention, the plastic tube comprises a cover layer and an adhesive layer which are coextruded, the adhesive layer being glued to the coil. In a method of this kind, preferably two extruders convey the materials at a suitable volume ratio into a shared extrusion head, in which a two-layer plastic tube is formed. The cable body introduced into the extrusion head or extrusion die is thus continuously provided with the two-layer plastic tube, which molds to the coil of the cable body and adheres to the cable body via the adhesive layer. The cable sheath or the layers of the cable sheath may also be extruded in multiple stages. Also, the adhesive layer may be applied to the cable body as a pre-fabricated part and only the cover layer may be extruded in the extrusion die.

To increase adhesion of the cable sheath or of the plastic tube to the cable body, the cable body is preferably provided with a plastic coat and heated before being introduced into the extrusion die. Optionally, the surface of the plastic coat or, if the cable body is uncoated, of the steel of the coil may additionally be activated using plasma, flame treatment or the like.

In a specific embodiment of the method according to the invention, the plastic coat is circumferentially flattened, i.e. reduced in diameter, at the circumference in the area of the coil prior to the application of the plastic tube to enlarge the surface of contact between the cable body and the cable sheath.

To prevent the surface of the plastic tube from becoming wrinkled in the longitudinal direction of the cable after extrusion, the plastic tube is cooled after having been applied to the cable body, preferably by means of a calibration device, in such a manner that its diameter remains constant in the longitudinal direction of the drive cable. Thus, the circumferential surface of the plastic tube has a constant cross-section in the longitudinal direction of the cable after cooling.

The calibration device is preferably a vacuum calibration device by means of which a vacuum is applied to the drive cable, causing the plastic tube or the cable sheath to be pulled radially outward against a calibration or contact surface until the plastic tube has cooled far enough for the desired circumferential shape to be maintained.

Furthermore, the calibration device preferably comprises a cooling basing through which the cable body provided with the plastic tube is pulled in order to be cooled.

The shape and structure of the surface of the plastic tube or cable sheath can be predetermined both by the design of the nozzle of the extrusion die and by the calibration device. In this way, a circumferential surface of the cover layer can be produced that is in particular circular in cross-section or provided with ribs.

Instead of a vacuum calibration device, a calibration device which generates pressure in the cavity of the drive cable defined by the cable sheath, the coil and the cable core and following a helical line, i.e. the coil, can be used. If a plastic that does not or only marginally shrink during cooling is used for the cable sheath, the calibration step—and thus the use of a calibration tool—can even be omitted.

Other advantages and advantageous embodiments of the subject-matter of the invention are apparent from the description, the drawing and the claims.

Examples of drive cables according to the invention and an example of an installation for producing a drive cable according to the invention are illustrated in a schematically simplified manner in the drawing and will be explained in more detail in the following description.

Figure 1:
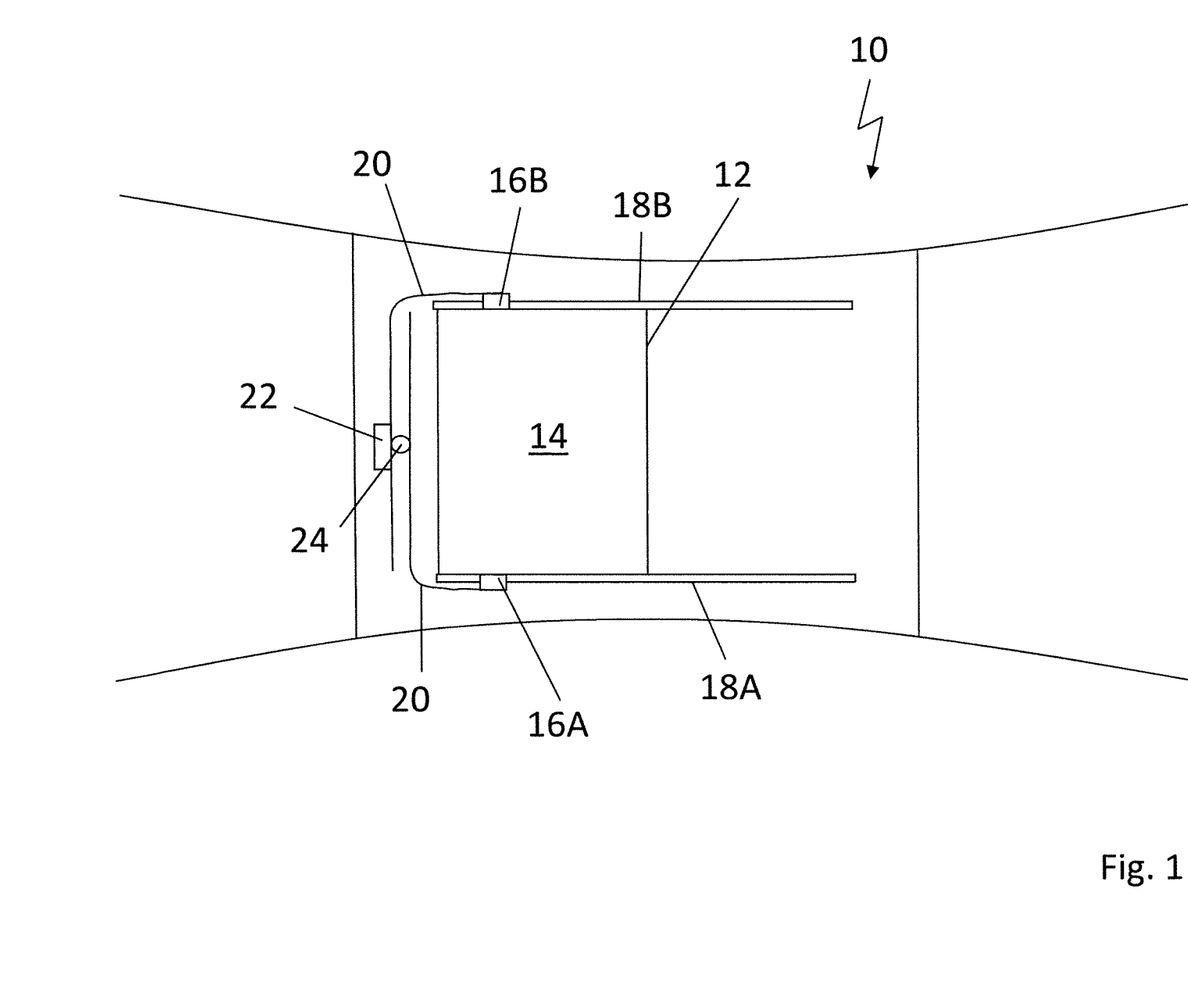
FIG. 1 is a schematic top view of a vehicle roof with a drive unit for a movable lid element.

In FIG. 1, a vehicle roof 10 of a passenger vehicle not illustrated otherwise is shown, vehicle roof 10 having a roof opening 12 which can be selectively closed or at least partially opened by means of a lid element 14. Lid element 14 thus constitutes a vehicle element that is movable relative to the vehicle body.

In order for lid element 14 to be adjustable, it is connected to a kinematic system which has a drive slide 16A, 16B on either side of a vertical longitudinal center plane of the roof, each drive slide 16A, 16B being guided in a respective guide rail 18A, 18B extending in the longitudinal direction of the roof.

Figure 2:
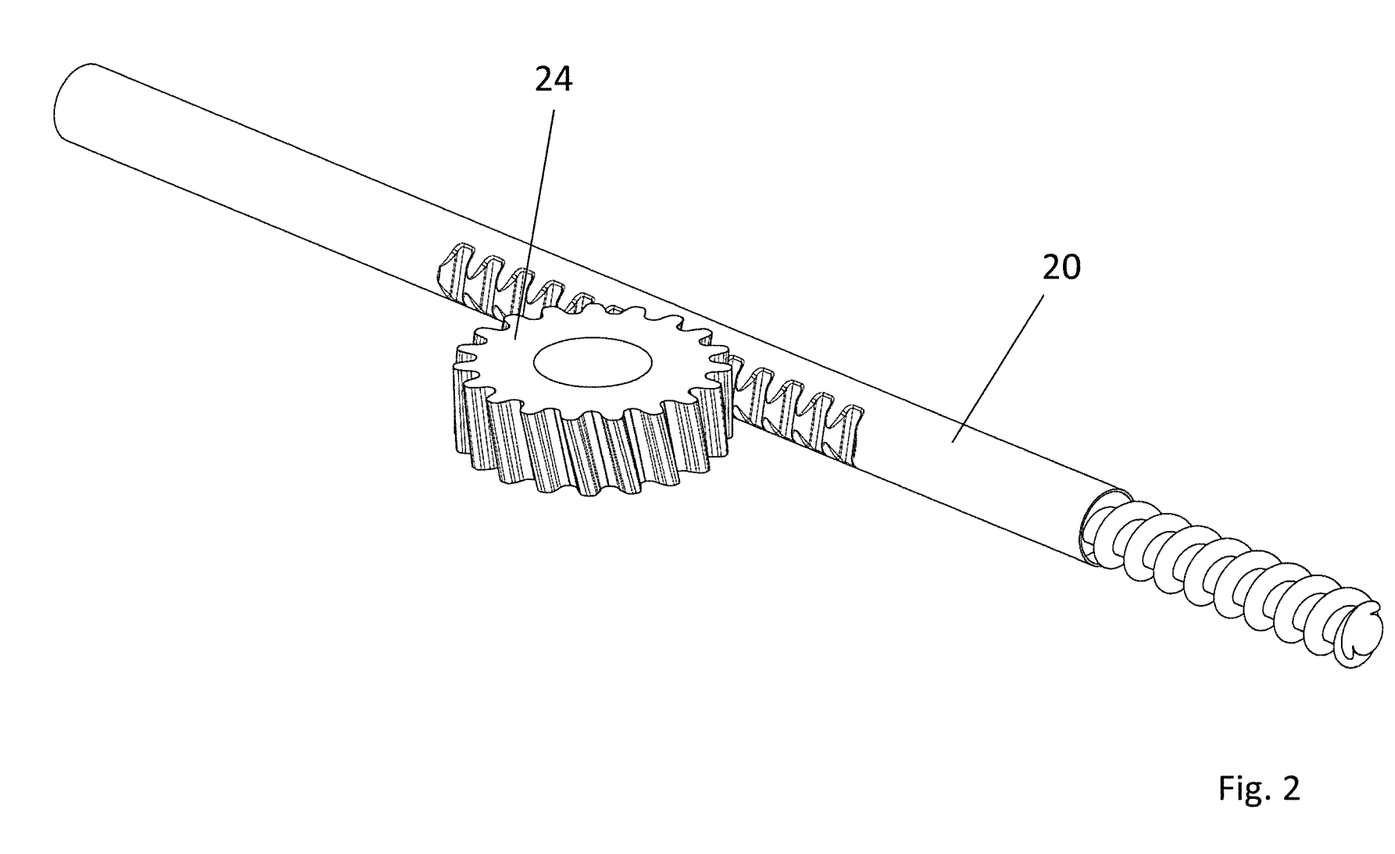
FIG. 2 is a perspective view of a drive cable according to the invention together with a drive pinion.
Figure 3:
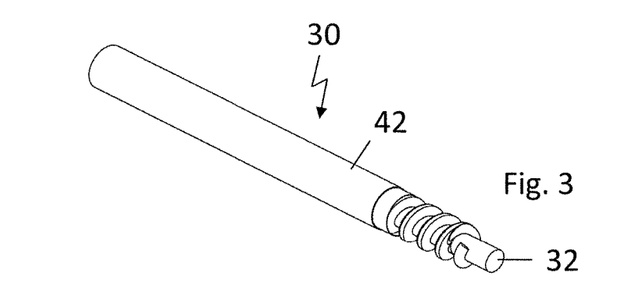
FIG. 3 is a perspective view of a first embodiment of a drive cable according to the invention.
Figure 4:
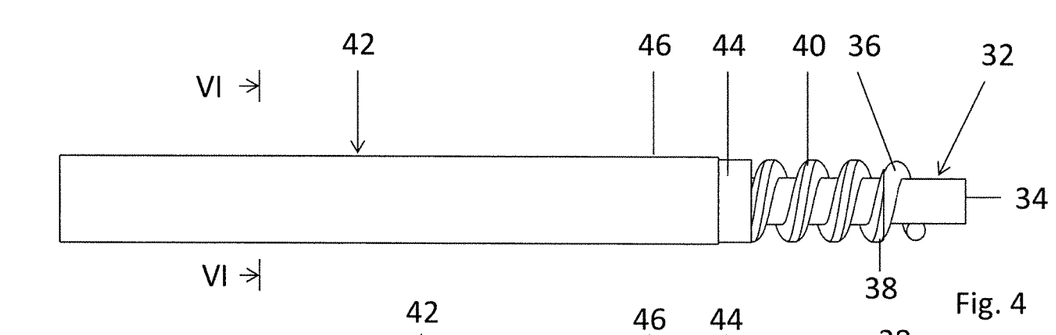
FIG. 4 is a side view of the drive cable of FIG. 3.
Figure 5:
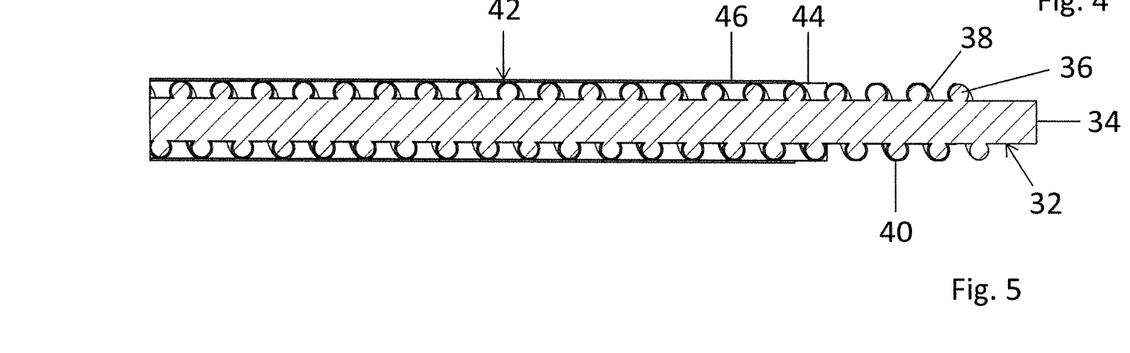
FIG. 5 is a longitudinal section through the drive cable of FIG. 3.
Figure 6:
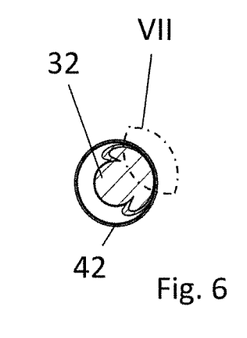
FIG. 6 is a section through the drive cable of FIG. 4 along line VI-VI in FIG. 4.

A compressively stiff drive cable 20 is connected to each of drive slides 16A and 16B. Drive cables 20 are routed toward a shared drive motor 22 via respective guide tubes or cable ducts and are engaged with a drive pinion 24 thereof. The engagement of the teeth of drive pinion 24 in one of drive cables 20 is illustrated in FIG. 2 independent of the other aforementioned components.

Drive cables 20 can be configured according to the embodiments illustrated in FIGS. 3 to 22.

FIGS. 3 to 7 show a drive cable 30 which has a cable body 32 composed of a flexible cable core 34 and a coil 36 surrounding cable core 34 in a helical line. Cable core 34 is a monolithic steel wire or a steel wire rope. Coil 36 consists of a steel wire.

Cable body 32, which forms what is referred to as a helix cable, is provided with a plastic coat 38 which consists of a polyamide, in particular of PA11. In the area of coil 36, plastic coat 38 is provided with a flattened portion 40, which consequently defines the circumferential surface of plastic coat 38 and thus of coil 36 and which also follows a helical line.

Figure 7:
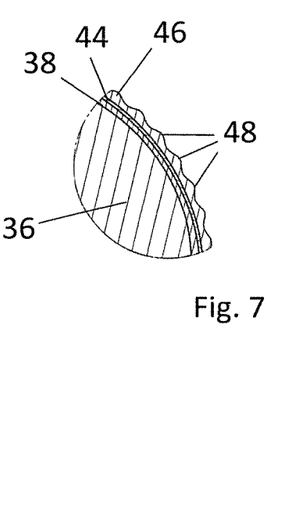
FIG. 7 is an enlarged view of area VII in FIG. 6.
Figure 8:
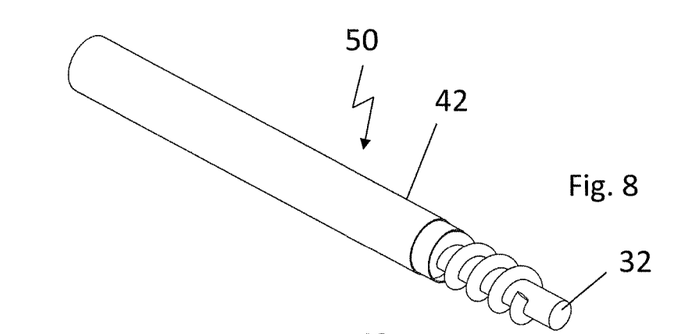
FIG. 8 is a perspective view of a second embodiment of a drive cable according to the invention.
Figure 9:
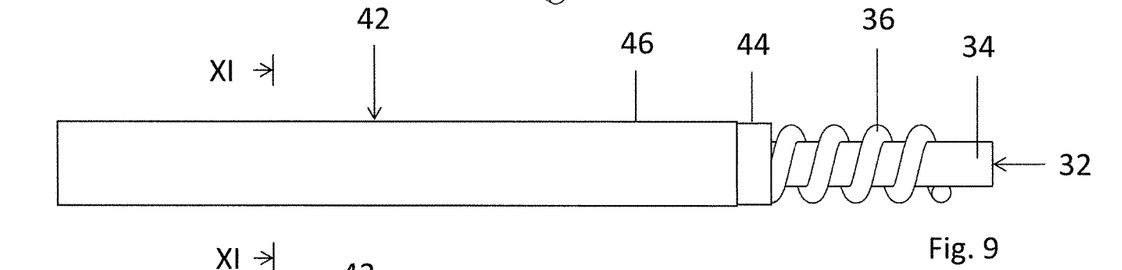
FIG. 9 is a side view of the drive cable of FIG. 8.
Figure 10:
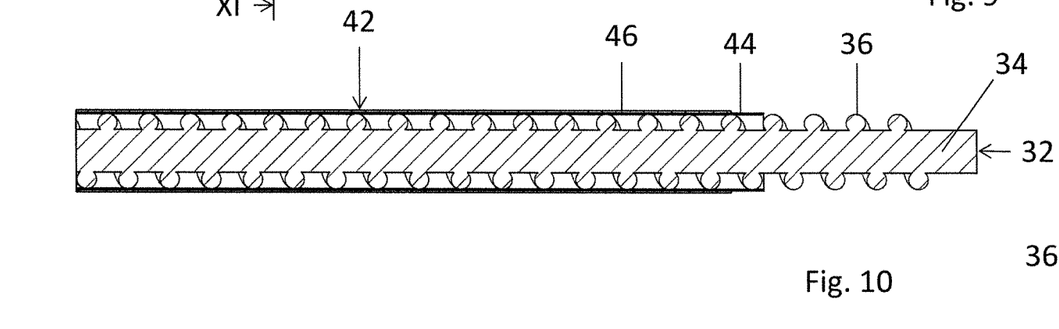
FIG. 10 is a longitudinal section through the drive cable of FIG. 8.
Figure 11:
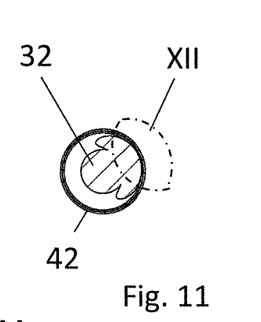
FIG. 11 is a section through the drive cable of FIG. 8 along line XI-XI in FIG. 9.
Figure 12:
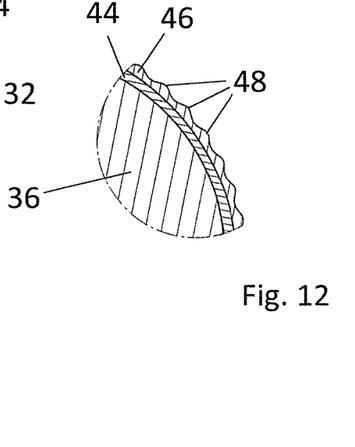
FIG. 12 is an enlarged view of the area XII in FIG. 11.
Figures 13, 14, 15, 16, 17:
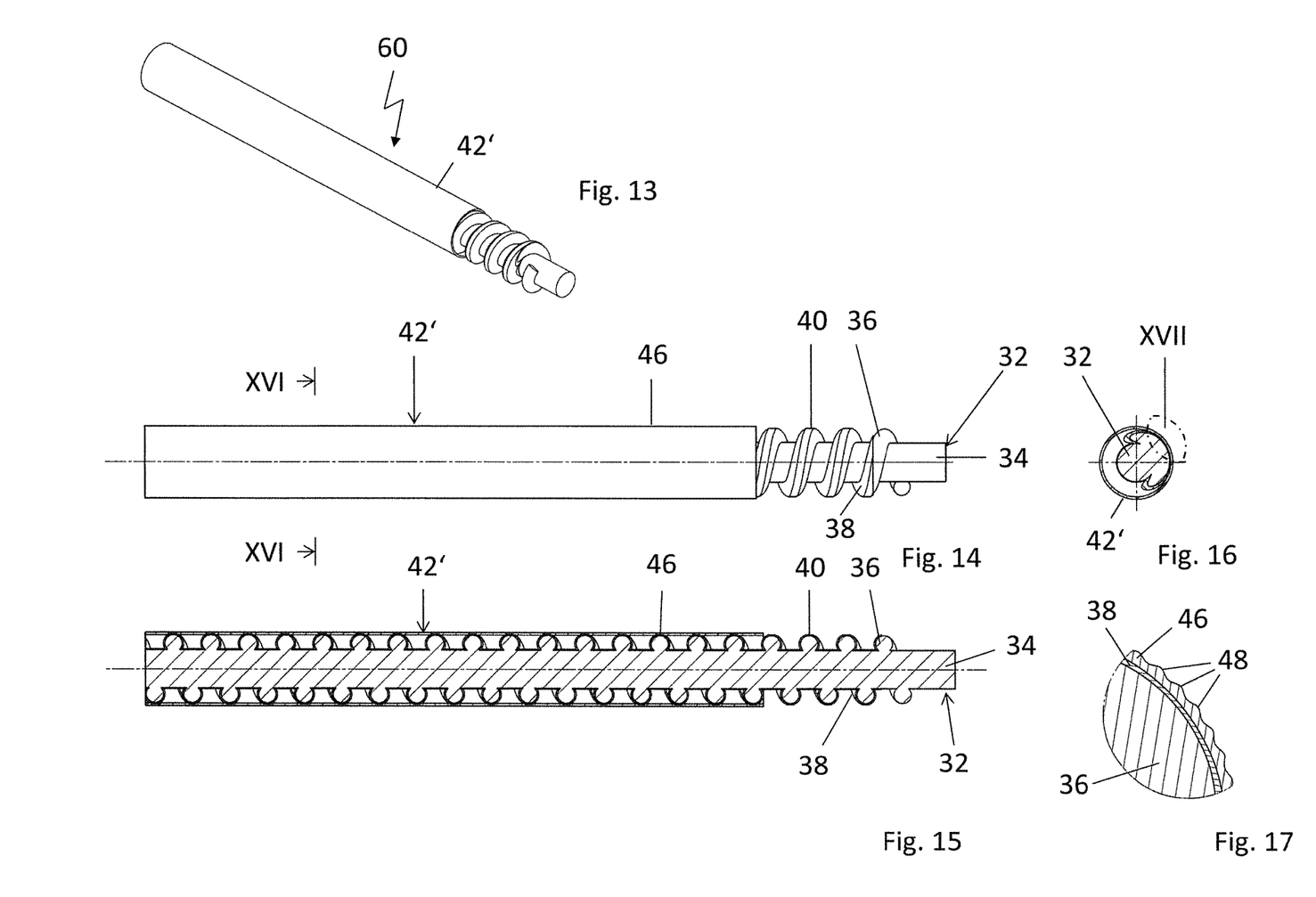
FIG. 13 is a perspective view of a third embodiment of a drive cable according to the invention.
FIG. 14 is a side view of the drive cable of FIG. 13.
FIG. 15 is a longitudinal section through the drive cable of FIG. 13.
FIG. 16 is a cross-section through the drive cable of FIG. 13 along line XVI-XVI in FIG. 14.
FIG. 17 is an enlarged view of area XVII in FIG. 16.
Figure 18:
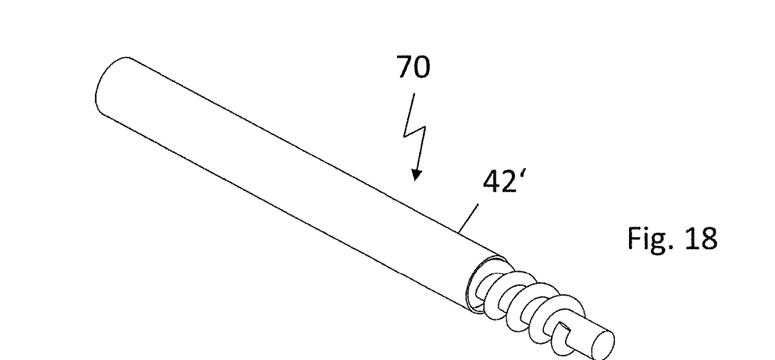
FIG. 18 is a perspective view of a fourth embodiment of a drive cable according to the invention.
Figures 19, 20, 21, 22:
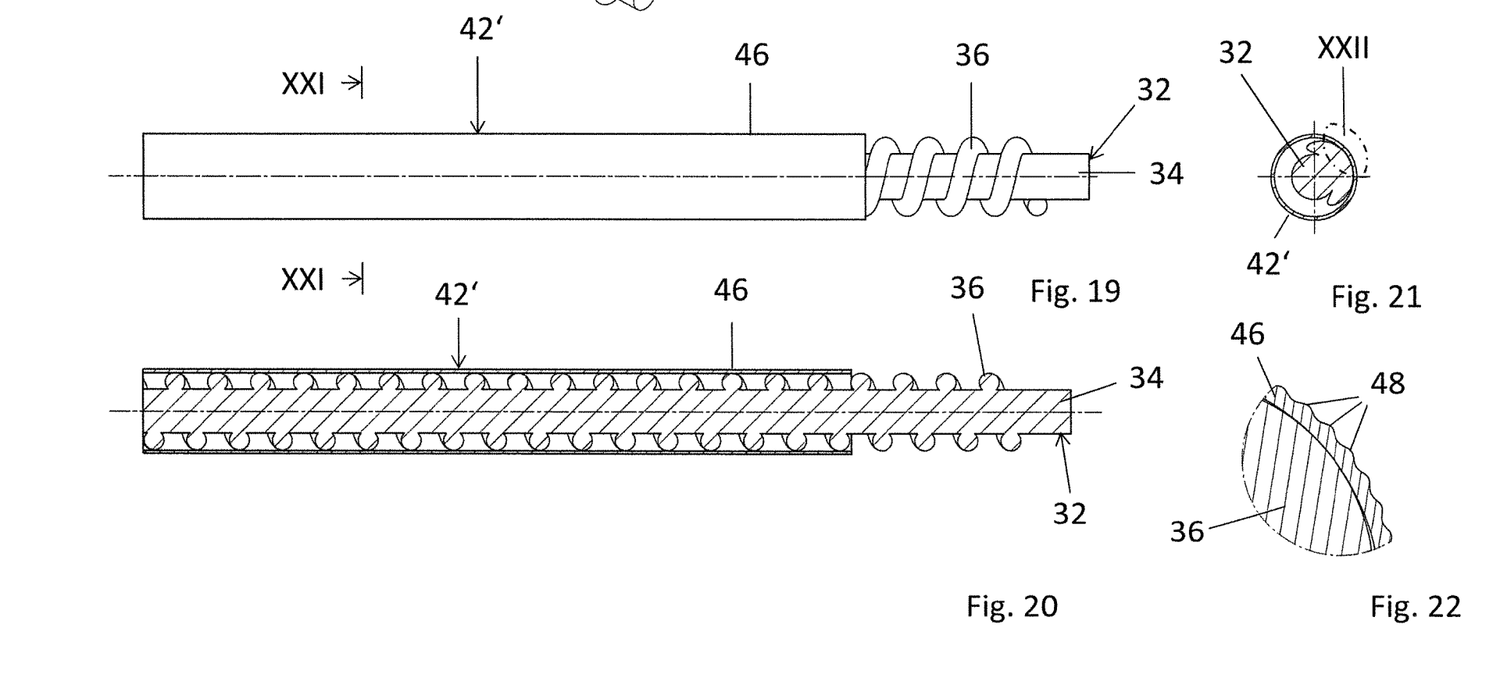
FIG. 19 is a side view of the drive cable of FIG. 18.
FIG. 20 is a longitudinal section through the drive cable of FIG. 18.
FIG. 21 is a cross-section through the drive cable of FIG. 18 along line XXI-XXI in FIG. 19.
FIG. 22 is an enlarged view of area XXII in FIG. 21.

Furthermore, drive cable 30 has a cable sheath 42 which is composed of two layers, namely an adhesive layer 44 and a cover layer 46. Adhesive layer 44, which is made of a long-chain polyethylene, serves to glue cable sheath 42 to cable body 32. Cover layer 46 forms the circumferential surface of drive cable 30 and is made of a polyamide, in particular of PA6. As shown in FIG. 7, cover layer 46 has ribs 48 which extend in the longitudinal direction of the cable and which may be configured as sacrificial ribs which are broken in during use of the drive cable or during guiding of the drive cable in a cable guide, drive cable 30 thus ideally adapting to the installation conditions.

FIGS. 8 to 12 show a drive cable 50 which largely corresponds to that of FIGS. 3 to 7 but differs from it in that cable body 32 has no plastic coat. Instead, drive cable 50 has a cable sheath 42 which is glued directly to the steel of coil 36 by means of adhesive layer 44 without an additional intermediate layer.

Otherwise, drive cable 50 is identical to that of FIGS. 3 to 7.

FIGS. 13 to 17 show a drive cable 60 which again largely corresponds to that of FIGS. 3 to 7 but differs from it in that it has a cable sheath 42' composed only a of cover layer 46 which has adhesive properties and which is glued directly to plastic coat 38 of cable body 32 in the area of flattened portion 40 without an additional adhesive layer or adhesion-promoting layer.

Otherwise, drive cable 60 is identical to that of FIGS. 3 to 7.

FIGS. 18 to 22 show a drive cable 70 which largely corresponds to the drive cable of FIGS. 13 to 17 but differs from it according to the embodiment of FIGS. 8 to 12 by having a single-layer cable sheath 42' comprising only a cover layer 46 which has adhesive properties and which is glued directly to the steel-wire coil 36 of cable body 32 without an additional adhesion-promoting layer and without the plastic coat of cable body 32.

Otherwise, drive cable 70 is identical to the drive cable of FIGS. 13 to 17.

Figure 23:
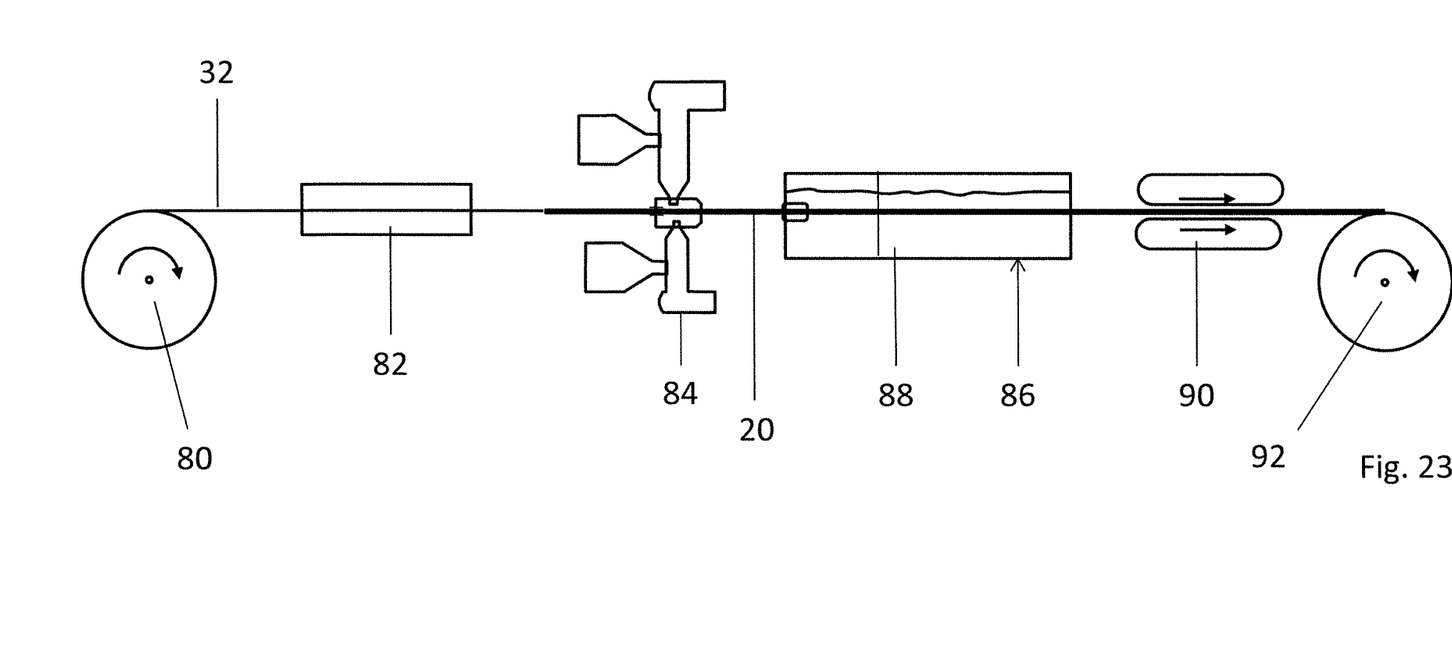
FIG. 23 is a schematic illustration of an installation for producing a drive cable according to the invention.

The drive cable illustrated in FIGS. 3 to 7 can be produced in the manner described below using the installation illustrated in FIG. 23.

In a first step, cable body 32, which is composed of cable core 34 and coil 36, is provided with a thin plastic coat made of a PA11 polyamide and is provided on a roll 80. Cable body 32 is unwound from roll 80 and conveyed to a heating station 2, where it is heated for pre-treatment. Then, heated cable body 32 provided with plastic coat 38 is introduced into an extrusion die 84, in which plastic coat 38 is first provided with flattened portion 40 in the area of coil 36 to produce an enlarged surface of contact, and then a plastic tube is applied to cable body 32 by co-extrusion and glued to cable body 32 to form cable sheath 42. The plastic tube is composed of adhesive layer 44 and cover layer 46. Adhesive layer 46 consists of a polyethylene and establishes an adhesive connection between cable sheath 42 and cable body 32. The extrusion process in extrusion die 84 may also take place using support air, causing a cable sheath having a constant outer diameter and outer cross-section across the length of the drive cable to be formed on cable body 32. Then, drive cable 20 consisting of cable body 32 and cable sheath 42 is conveyed to a calibration device 86 which is realized as a vacuum calibration device and in which drive cable 20 is cooled and simultaneously subjected to a vacuum so that cable sheath 42 does not shrink more in the area of the coil gaps of cable body 32 than in the area of coil 36. This calibration of the not yet set plastic layers of cable sheath 42 continues until sufficient solidification is achieved and no further shrinkage of cable sheath 42 is to be expected. The vacuum in the calibration device pulls tube-shaped cable sheath 82 radially outward against a calibration boundary, which predetermines the structure of the circumferential surface of cable sheath 42 and also ensures that the desired shape of cable sheath 42 is maintained. In calibration unit 86, drive cable 20 is additionally moved through a cooling basin 88 filled with water. Cooling basin 88 is typically longer than the section of calibration unit 86 in which drive cable 20 is subjected to the vacuum.

Downstream of the calibration device, drive cable 20 is wound onto a roll 92 by means of a conveying device 90. Thereafter, it can be processed further.

The process described above allows precise tuning and setting of tolerances of the outer diameter and the outer structure of drive cable 20.

REFERENCE SIGNS

10 vehicle roof
12 roof opening
14 lid element
16A,B drive slide
18A,B guide rail
20 drive cable
22 drive motor
24 drive pinion
30 drive cable
32 cable body
34 cable core
36 coil
38 plastic coat
40 flattened portion
42 cable sheath
44 adhesive layer
46 cover layer
48 ribs
50 drive cable
60 drive cable
70 drive cable
80 roll
82 heating station
84 extrusion die
86 calibration unit
88 cooling basin
90 conveying device
92 roll

The invention claimed is:

1. A drive cable for actuating a vehicle element movable relative to a vehicle body, the drive cable comprising:
a cable body having a flexible cable core around which a coil following a helical line is coiled, the coil serving to engage with a gear wheel,
the cable body being provided with a cable sheath,
wherein the cable sheath is glued to the coil,
and the cable sheath comprises a cover layer and an adhesive layer, the adhesive layer being glued to the coil.

2. The drive cable according to claim 1, wherein the cable sheath, the coil and the cable core define a cavity which follows a helical line, and the cable sheath has a wrinkle-free surface on its side facing away from the cable core when viewed in the longitudinal direction of the cable.

3. The drive cable according to claim 1, wherein the cable body is provided with a plastic coat which forms a surface of contact with the cable sheath.

4. The drive cable according to claim 3, wherein the plastic coat is made of a polyamide.

5. The drive cable according to claim 3, wherein the plastic coat has a flattened portion for enlarging the surface of contact at the circumference of the coil.

6. The drive cable according to claim 1, wherein the cable sheath comprises a layer made of a polyamide.

7. The drive cable according to claim 1, wherein the cable sheath has ribs extending in the longitudinal direction of the cable at its circumferential surface.

8. A method for producing the drive cable of claim 1, the method comprising:
providing a cable body which comprises a flexible cable core provided with a coil following a helical line;
introducing the cable body into an extrusion die; and
extruding a plastic tube by means of the extrusion die and gluing the plastic tube to the coil of the cable body to form a cable sheath surrounding the cable body.

9. The method according to claim 8, wherein the step of extruding the plastic tube comprises coextruding a cover layer and an adhesive layer, and gluing the adhesive layer to the coil.

10. The method according to claim 8, further comprising the step of providing the cable body with a plastic coat.

11. The method according to claim 10, further comprising the step of heating the cable body before the step of introducing the cable body into the extrusion die.

12. The method according to claim 10, further comprising the step of flattening the plastic coat in the area of the coil to enlarge the surface of contact between the plastic tube and the plastic coat before the plastic tube is applied.

13. The method according to claim 8, further comprising the step of cooling the plastic tube after having been applied to the cable body by means of a calibration device in such a manner that its diameter is wrinkle-free and stays constant throughout in the longitudinal direction of the drive cable.

14. The method according to claim 13, wherein the calibration device is a vacuum calibration device.

15. The method according to claim 13, wherein the calibration device comprises a cooling basin and further comprises the step of pulling the cable body provided with the plastic tube through the cooling basin.

\* \* \* \* \*